United States Patent [19]

Ishikawa

[11] Patent Number: 4,823,638

[45] Date of Patent: Apr. 25, 1989

[54] TOOTH PROFILE OF SPLINE OF STRAIN WAVE GEARING

[75] Inventor: Shoichi Ishikawa, Yokohama, Japan

[73] Assignee: Harmonic Drive Systems Inc., Tokyo, Japan

[21] Appl. No.: 114,119

[22] Filed: Oct. 27, 1987

[30] Foreign Application Priority Data

Nov. 5, 1986 [JP] Japan ................................. 61-262930

[51] Int. Cl.⁴ ........................ F16H 33/00; F16H 55/06
[52] U.S. Cl. ........................................ 74/640; 74/462
[58] Field of Search ................................ 74/640, 462

[56] References Cited

U.S. PATENT DOCUMENTS

| | | | |
|---|---|---|---|
| 1,682,563 | 8/1928 | Hill | 74/462 |
| 1,909,117 | 5/1933 | Digott | 74/462 |
| 2,128,815 | 8/1938 | Guest | 74/462 |
| 2,285,910 | 6/1942 | Buigne | 74/63 |
| 2,412,463 | 12/1946 | McDaniel | 33/74 |
| 2,849,897 | 9/1958 | Walma | 74/804 |
| 2,906,143 | 9/1959 | Musser | 74/640 |
| 2,929,266 | 3/1960 | Musser | 74/640 |
| 2,931,249 | 4/1960 | Musser | 74/640 |
| 2,932,986 | 4/1960 | Musser | 74/665 |
| 2,943,508 | 7/1960 | Musser | 74/424.8 |
| 2,954,205 | 9/1960 | Musser | 251/134 |
| 2,959,065 | 11/1960 | Musser | 74/483 |
| 2,960,884 | 11/1960 | Hill, 2nd. | 74/462 |
| 2,983,162 | 5/1961 | Musser | 74/640 |
| 3,001,840 | 9/1961 | Musser | 308/193 |
| 3,020,775 | 2/1962 | Musser | 74/440 |
| 3,039,324 | 6/1962 | Waterfield | 74/640 |
| 3,091,979 | 6/1963 | Schaeffer | 74/640 |
| 3,117,763 | 1/1964 | Musser | 251/165 |
| 3,147,640 | 9/1964 | Musser | 74/640 |
| 3,169,202 | 2/1965 | Proctor et al. | 310/83 |
| 3,172,299 | 3/1965 | Musser | 74/388 |
| 3,178,963 | 4/1965 | Musser | 74/640 |
| 3,182,525 | 5/1965 | Tinder | 74/640 |
| 3,196,713 | 7/1965 | Robinson | 74/640 |
| 3,415,143 | 12/1968 | Ishikawa | 74/640 |
| 3,555,929 | 1/1971 | Hossfeld | 74/640 |
| 3,996,816 | 12/1976 | Brighton | 74/640 |
| 4,051,745 | 10/1977 | Ishikawa | 74/462 |
| 4,149,431 | 4/1979 | Ronverol | 74/462 |
| 4,703,670 | 11/1987 | Kondo | 74/640 |

OTHER PUBLICATIONS

Geometric Conditions of Harmonic Drives (Acta Technica Academiae Scientiarum Hungaricae, 94(1–2), pp. 63–72 (1982).
Investigation of the Engagement of Harmonic Drives (Acta Technica Academiae Scientiarum Hungaricae, 94(1–2), pp. 91–100.

Primary Examiner—Dirk Wright
Attorney, Agent, or Firm—Frishauf, Holtz, Goodman & Woodward

[57] ABSTRACT

A strain wave gearing comprising a circular spline, flexspline disposed inside the circular spline, a wave generator for deforming the flexspline into, for example, an ellipsoid and a motor for rotating the wave generator to produce a relative rotation between the flexspline and the circular spline. The strain wave gearing is sometimes termed a harmonic drive transmission. In the strain wave gearing, the tooth face of each of the splines is formed in line with a mapping curve which is a similarity transformation having a reduced scale of ½ applied to a movement locus of the flexspline to the circular spline in accordance with the configuration of the wave generator, the transformation being effected on a reference point where the splines are transferred from the contact condition to a disengagement from each other. Thus, the teeth of the flexspline engage with those of the circular spline in the broad extent of the engagement region.

4 Claims, 8 Drawing Sheets

FIG. 9
WIND UP CURVE

TOOTH PROFILE OF SPLINE OF STRAIN WAVE GEARING

BACKGROUND OF THE INVENTION

1. Field of the Invention

The present invention relates to a strain wave gearing, and more particularly to an improvement of tooth profiles of a circular spline a flexspline used in the strain wave gearing.

2. Description of Prior Art

A strain wave gearing has been well known as seen from U.S. Pat. No. 2,906,143 granted to Musser. A typical strain wave gearing comprises a rigid circular spline, a flexspline having teeth which number more or less than that of the circular spline by 2n ("n" being a positive integer) and being disposed in the circular spline, and a wave generator disposed in the flexspline to deform the flexspline to, for example, an elliptic configuration so as to bring the flexspline into engagement with the circular spline at two points on the major axis of the ellipsoid. The wave generator includes an elliptic cam plate and a ball bearing fittingly mounted on the outer periphery of the cam plate. The outer wheel of the bearing is inserted into the flexspline to deform the flexspline to the elliptic shape. In the strain wave gearing as mentioned above, the input shaft fixed to the cam plate of the wave generator is rotated while the ellipsoid of the flexspline is rotated. Upon rotating the ellipsoid, one of the flexspline and the circular spline is rotated relative to the other by an amount that is in proportion to the difference in the number of the teeth between both splines. Where an output shaft is mounted on either the flexspline or the cicular spline, the output shaft is rotated very slowly in comparison with the input shaft. Thus, the strain wave gearing has frequently been applied to precision machinery because in the gearing, a high reduction ratio is obtained in spite of the low number of elements employed therefor.

Recent developments have been made with respect to teeth used in a strain wave gearing so as to improve engagement properties of the teeth to obtain a good performance and increase the load capacity. A basic gear tooth is disclosed in detail in U.S. Pat. No. 3,415,143 granted to Ishikawa, in detail. The tooth thereof is formed in a linear shape. Thus, the elliptic flexspline is engaged with the circular spline only at the points on the major axis of the ellipsoid, resulting in a lowering of the allowable transfer torque. The Ishikawa patent teaches that an involute tooth is applied to the gearing.

If the tooth of the Ishikawa patent is applied to the gearing, however, it is difficult to bring the flexspline into a continuous engagement with the circular spline until one of the splines is completely separated from the other. More specifically, in the case of a zero or negative deviation as shown in the curves a and c of FIG. 4 of the Ishikawa patent, the flexspline engaging with the rigid circular spline has a movement locus of the typical point of the tooth thereof (except a portion of the top of the curve c), the locus being concave with respect to the circular spline. In order to obtain the continuous contact between both splines, it is necessary that the profile of the tooth of the circular spline be formed convex in shape, unlike the linear tooth and the involute tooth. Where the movement locus of the typical point of the flexspline is convex (positive deviation) as shown in the curve b of FIG. 4 of the Ishikawa patent, deflection of the flexspline increases and then the bending stress increase. Thus, it is disadvantageous that the available range of the locus is small and that there are few teeth which are in mesh with each other. There is room for improving the strain wave gearings of the '143 patent with regard to allowable transfer torque.

SUMMARY OF THE INVENTION

It is, therefore, an object of the invention to provide a novel strain wave gearing in which the flexspline is continuously brought into contact with the circular spline within the meshing region of loth splines.

It is another object of the invention to improve fatigue strength of the flexspline, in particular, the fatigue strength of the tooth root thereof.

It is a further object of the invention to obtain high torsional stiffness of the strain wave gearing.

It is a still further object to provide a strain wave gearing maintaining the same high efficiency as the conventional gearing.

To achieve these objects, a feature of the present invention resides in the provision of a stain wave gearing comprising a rigid circular spline, a flexible flexspline disposed inside the circular spline, a wave generator for deforming the flexspline to be capable rotating the deformed configuration, and driving means for rotating the wave generator to produce a relative rotation between the flexspline and the circular spline, characterized in that the tooth face of the each of the splines is formed in line with a mapping curve that is a similarity transformation having a reduce scale of ½ applied to a movement locus of the flexspline to the circular spline in accordance with configuration of the wave generator, the transformation being effected on a reference point where the splines are transferred from the contact state to a state of disengagement from each other.

The foregoing and other features of the invention will be described in detail in connection with an illustrated embodiment and with reference to the accompanying drawings.

DESCRIPTION OF THE PREFERRED EMBODIMENT

Figure 1:
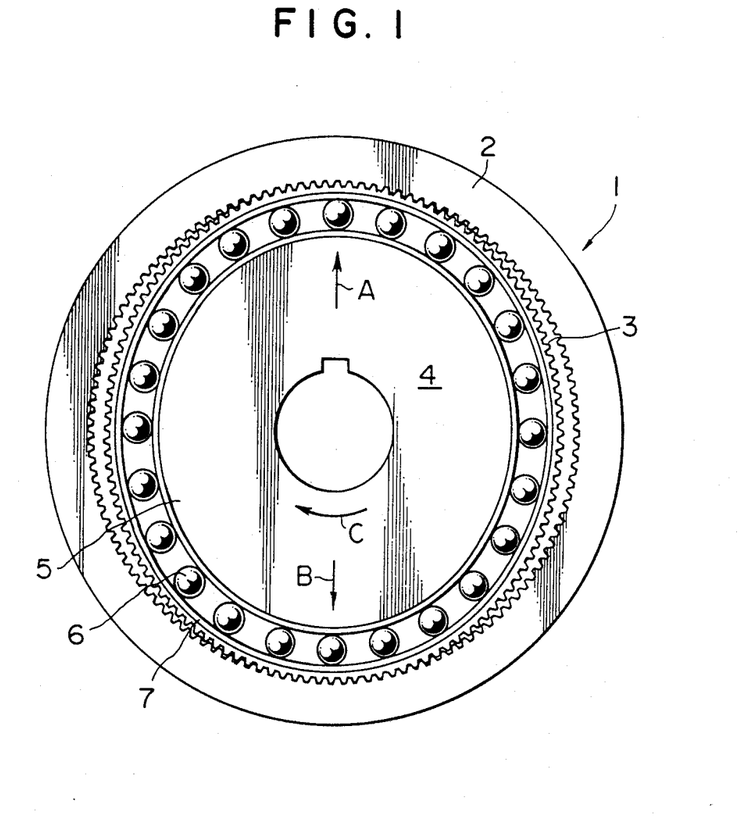
FIG. 1 is a front view of a conventional strain wave gearing.

Referring to the drawings, particularly to FIG. 1, there is shown a typical strain wave gearing 1. Before discussing the present invention, the principle of the strain wave gearing 1 is described with reference to FIG. 1 as well as FIGS. 2(a)-(b) which illustrate an operation of the gearing.

The strain wave gearing 1 comprises a rigid circular spline 2, a flexible flexspline 3 disposed inside the circular spline 2, and a wave generator 4 of an elliptic configuration which fits in the flexspline 3 to deform the flexspline into the ellipsoid. The wave generator 4 includes an inner cam plate 5 of an elliptic profile and a flexible ball bearing 6 fittingly mounted on the periphery of the cam plate 5 to deform the bearing into an ellipsoid. The bearing 5 has an outer race 7 which fits in the flexspline 3. The flexspline is deformed into an ellipsoid by the wave generator 4 so that the flexspline is engaged with the circular spline 2 at two points on the major axis of the ellipsoid and the adjacent regions thereof. In FIG. 1, the engagement points are illustrated as two points shown by arrows A and B. By virtue of the ball-bearing 6 of the wave generator 4, the ellipsoid of the flexspline 3 is rotated when the cam plate 5 is rotated, but the flexspline 3 is not directly rotated by the plate. In this embodiment, the flexspline 2 has the teeth number which is less than that of the circular spline 2 by 2n ("n" being a positive integer), for example 4.

Figure 2:
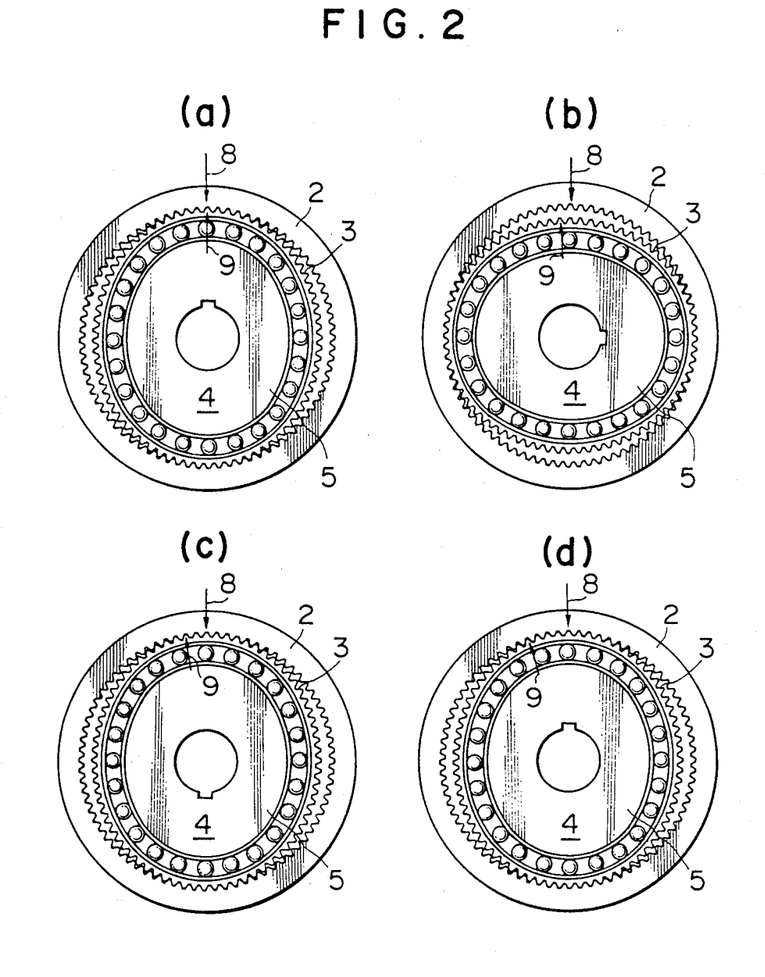
FIGS. 2(a), 2(b), 2(c) and 2(d) illustrate an operation of the strain wave gearing of FIG. 1.

The operation of the strain wave gearing 1 will now be described with reference to FIGS. 2(a)-(d). When the cam plate 5 of the wave generator 4 is placed at the position shown in FIG. 2(a), one tooth space 8 of the circular spline 2 is engaged with one tooth 9 of the flexspline 3 on the major axis of the elliptic flexspline. (In fact, some teeth are also engaged with each other in the extents adjacent to the space 8 and the tooth 9.) Upon rotating the cam plate 5 by 90 degrees as (FIG. 2(b)), the ellipsoid of the flexspline 3 is rotated so that the engagement points are shifted to disengage the tooth 9 from the space 8 which the major axis of the ellipsoid is shifted. As shown in FIG. 2(c), when the cam plate 6 is further rotated, the space 8 is again engaged with the tooth 9 at a position that is shifted by one-half of the difference (4 teeth) in the number of teeth, i.e. by n teeth (2 teeth). As shown in FIG. 2(d), when the cam plate 5 has been rotated by 360 degrees, the space 8 is shifted relative to the tooth 9 by an amount which is the difference in the number of teeth (i.e. 4 teeth). If sequential shifting of the engagement points are outputted, a great reduction ratio can be obtained.

The present invention improves the profiles of the circular spline and the flexspline of the strain wave gearing, so that almost all of the teeth thereof are engaged with each other over not only the engagement point but also the extent to both sides of the engagement point. In this application, the wordings "continuous contact" is used for the contiguous engagement or contact of the teeth over the extent mentioned above.

To achieve the continuous contact, a tooth profile of the present invention is determined from a locus of the tooth moving according to the configuration of the wave generator. It is very difficult to precisely and theoretically produce a tooth profile for the continuous contact on the basis of the movement locus mentioned above. It has not yet been heard that attempts for the continuous contact were successfully made. The present invention solves the above problems by means of an approximation to a rack mechanism.

In summary, in accordance with the present invention, the engagement between the flexspline and the circular spline is deemed to be an approximation to that of a rack mechanism. A locus of movement of the flexspline to the circular spline is obtained from a wave generator used in the strain wave gearing. A mapping curve is produced from the movement locus of the flexspline by an similarity transformation having a reduced scale of ½. The "similarity transformation" term is used herein in its conventional mathematical meaning to describe transformation of a figure, or shape, in accordance with a selected reduced scale to a corresponding figure. Thus, applying a similarity transformation with a given reduced scale transforms an original figure to a corresponding, similar figure. The curve obtained in the above-described manner is used as a profile for the tooth face of the circular spline and of the flexspline. The approximation is in such a range that errors are allowable because the splines of the strain wave gearing have at least one hundred teeth, and generally more than 160 teeth.

Figure 3:
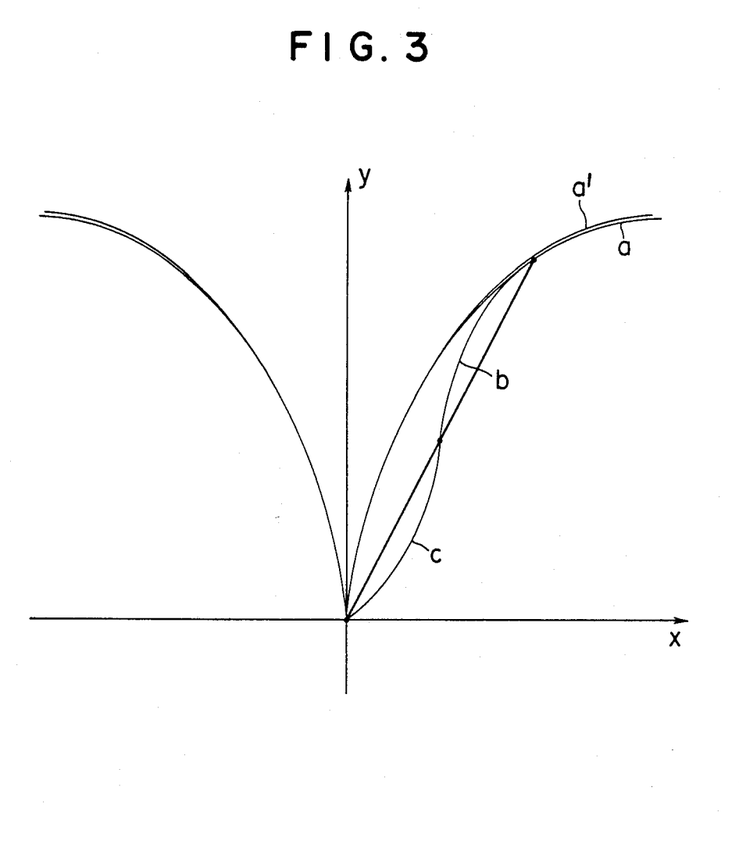
FIG. 3 shows the extent of an approximation arrived at by means of a rack tooth approximating method.

FIG. 3 shows an example of the degree of the approximation. In FIG. 3, the reference character a designates a movement locus of a rack mechanism, and the reference character a' indicates a movement locus of the spline. The drawing corresponds to FIG. 4 of U.S. Pat. No. 3,415,143 to Ishikawa, the drawing which is invented with respect to the graph of FIG. 3 of the present application. It should be appreciated that there is no substantial difference between both curves a and a'. In FIG. 3, the reference characters b and c show examples of the tooth faces of the circular spline and the flexspline. In the meantime, FIG. 3 illustrates a movement locus having no deviation, wherein the coordinates x and y are given by the following formula.

$$x = \tfrac{1}{2}m(2\theta - \sin 2\theta)$$

$$y = m(1 - \cos 2\theta)$$

Here, $\theta$ is a parameter and m is a module of the tooth.

Figure 4:
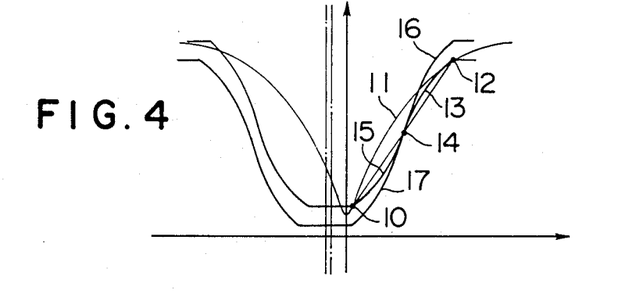
FIG. 4 shows profiles of teeth of a flexspline and a circular spline which are brought into continuous contact with each other.

FIG. 4 shows how the curves of the tooth profiles mentioned above are obtained. In FIG. 4, the point 10 designates a tooth crest of the flexspline, and the curve 11 shows a movement locus of the crest 10 which is defined by the wave generator, in particular, the configuration of the cam plate thereof. The point 12 shows the limit of the contact between both splines or the outermost point of their contact (i.e. the outermost engagement position apart from the center of the engagement). The curve 13 is the tooth face of the circular spline. The curve 13 is a mapping curve obtained a similarity transformation applied to the portion of the curve 11 between the points 10 and 12, with the reference point being the contact limit 12. The point 14 is obtained by the transformation from the point 10. The curve 15 between the points 14 and 10 is obtained by rotating the curve 13 about the point 14 by 180 degrees, and the curve 15 shows a profile for the tooth face of the flexspline. The curve 16 shows a profile for the tooth flank of the flexspline and curve 17 shows a profile for the tooth flank of the circular spline. These profiles of the tooth flanks can be formed with a arbitary or suitable configuration unless both splines interface with each other.

Figure 5:
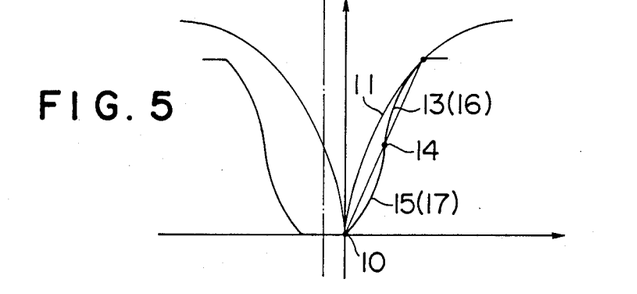
FIG. 5 shows the profiles of the teeth of FIG. 4 under a non-deviated condition.

FIG. 5 illustrates a specific case wherein both splines are in a non-deviated condition (the curve a in FIG. 4 of U.S. Pat. No. 3,415,143). In other words, the circular spline is engaged with the flexspline to bring the tooth of one of the splines into a full contact with the other spline at the center of the engagement (the points shown by the arrows A and B in FIG. 1). Thus, the curve 13 of FIG. 5 (the profile of the tooth face of the circular spline) is coincident with the curve 16 (the profile of the tooth flank of the flexspline), and the curve 15 of FIG. 5 (the profile of the tooth face of the flexspline) coincides with the curve 17 (the profile of the tooth flank of the circular spline). This means that the tooth face and the tooth flank of the circular spline are fully engaged with the tooth flank and the tooth face of the flexspline, respectively.

The profile of the tooth face of the circular spline and of the flexspline as shown in FIG. 4 is obtained by assuming that both splines are a rack mechanism having an infinite number of teeth. In an actual strain wave gearing, the spline is provided with a limited number of teeth. Typically, however, compared with an ordinary gear, the spline is formed with a large number of teeth, for example, 160 teeth. Thus, the approximation is in an allowable range and of usable accuracy. Accordingly, although previously it has been difficult to obtain a profile of the tooth capable of maintaining the continuous contact, the present invention provides an ideal spline having a tooth profile whereby the continuous contact is maintained over the engagement region.

Figure 6:
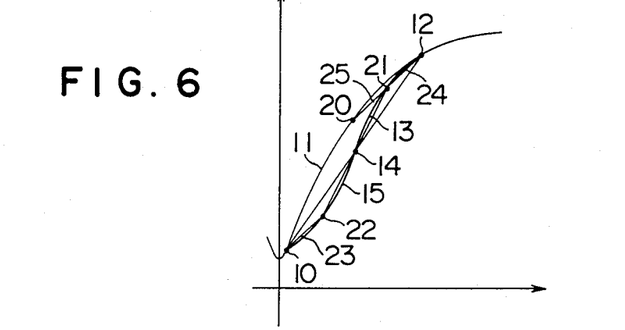
FIG. 6 shows continuous contact being made on the tooth faces as shown in FIG. 4.

FIG. 6 proves that one of the tooth faces having the profile shown in FIG. 4 is brought into continuous contact or engagement with the other face in the engagement region of the strain wave gearing. In FIG. 6, the curves 11, 13 and 15 and the points 10, 12 and 14 of FIG. 4 are used as they stand. A point 20 on the curve 11 is a movement locus of the flexspline. A point 21 on the curve 13 corresponds to the point 20 obtained by the similarity transformation as mentioned above. A point 22 on the curve 15 corresponds to the point 21 (i.e. the point 20) on the curve 13 rotated by 180 degrees.

In FIG. 6, the line 23 between the points 10 and 22, the line 24 between the points 12 and 21 and the line 25 between the points 20 and 21 are equal to each other because the curve 15 is symmetrical with the curve 13 and the curve 13 is a similarity-transformed line of the curve 11. For the same reasons, the line 23 is parallel to the line 25. The tangential line at the point 21 on the profile curve is parallel to the tangential line at the point 22. Provided that the tooth face curves 10-22-14 (equal to the curve 15) of the flexspline are parallel-shifted so that the point 10 reaches the point 20, the point 22 reaches the point 21 and the tangential line at the point 22 is coincident with the tangential line at the point 21. It should be appreciated that the curves 15, 13 indicate the proper profiles for the tooth faces of both splines whereby the continuous contact can be maintained in the engagement region of both splines.

Upon obtaining the tooth face profile, to what extent the movement locus of the flexspline is similarity-transformed is arbitarily determined. In the present invention, the profile of the tooth face is important in order to maintain the continuous contact between both spline of the strain wave gearing. The tooth flank profile, however, is arbitary as long as the teeth of both splines do not interfere with each other. For example, in the case where the engagement of the splines is effected from the deepest point under no deviation, both splines can be fully engaged with each other at the deepest engagement point, as show in FIG. 5, if the tooth flank of the spline is provided with a profile which is symmetrical with the tooth face profile of the pitch point thereof.

Although the above descriptions are made on such a strain wave gearing whereby the flexspline is engaged with the circular spline at two points, the present invention is not limited to such a strain wave gearing. For example, the present invention can be applied to another strain wave gearing in which the difference between the teeth of both splines is 3n and the splines are engaged with each other at three points, and can be further applied to similar gearings.

Figure 7:
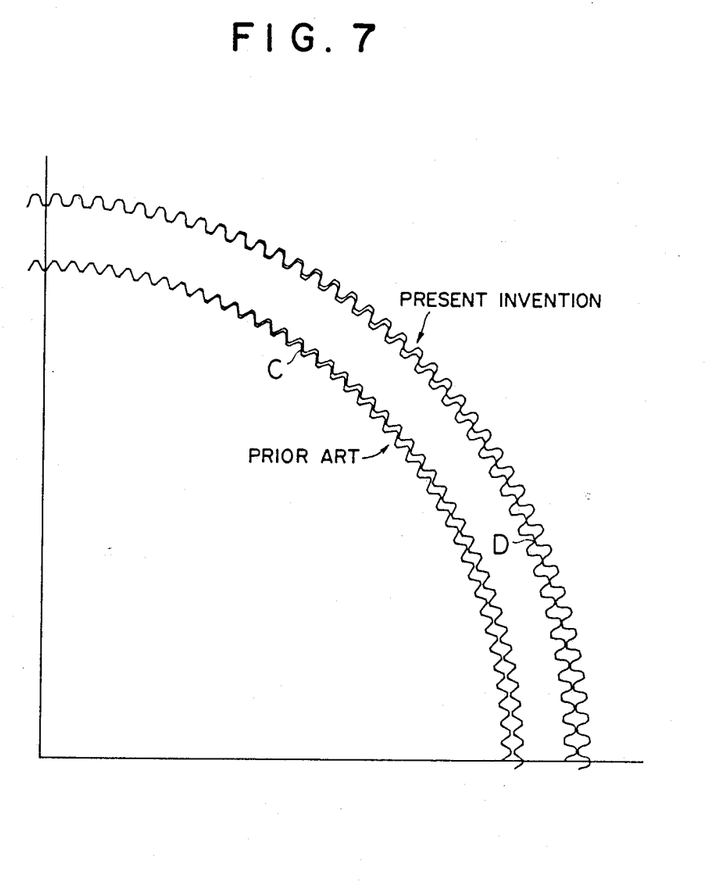
FIG. 7 illustrates a comparison of the engagement of the continuous contact type tooth with that of a conventional tooth.

According to the present invention, the flexspline is brought into continuous contact or engagement with the circular spline within the engagement extent of both splines because the tooth face of each of the splines is formed in line with a mapping curve that is a similarity transformation having a reduced scale of ½ applied to a movement locus of the flexspline to the circular spline in accordance with the configuration of the wave generator, the transformation being effected using a reference point where the splines are transferred from the contact state to a state of disengagement from each other. FIG. 7 shows the continuous contact mentioned above. In FIG. 7, the conventional tooth profile (the linear tooth profile is shown but the involute tooth profile is very close to this profile) teaches that both splines begin to disengage from each other at the point C where both splines are in the engagement region. On the other hand, the tooth profile of the present invention shows that both splines are engaged with each other so far as the splines are positioned in the engagement region the limit point of which is indicated by the point D. Thus, the strain wave gearing of the present invention provides the continuous contact as defined in this application over the entire extent of the engagement of both splines.

Figure 8:
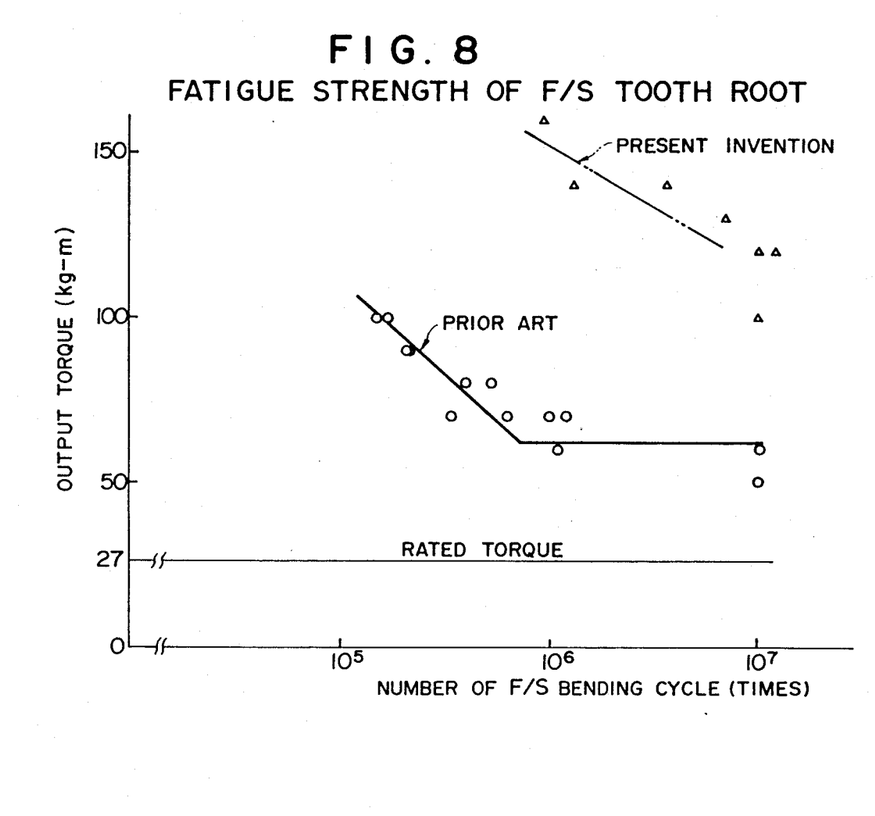
FIG. 8 is a graph showing fatigue strength of a tooth root of a flexspline of the present invention compared to that of a conventional flexspline.

The continuous contact of the present invention improves the fatigue strength property of the flexspline tooth root. FIG. 8 shows the result of a test in which the tooth root of the flexspline was cyclicly bent. In the graph of FIG. 8, the conventional flexspline broke under a condition that the number of the flexspline bending cycle is no more than approximately $1 \times 10^{-6}$ times with an output torque of more than 60 kg-m. The flexspline of the present invention, however, did not break until $7 \times 10^6$ times in the bending cycle under an output torque of 130 kg-m which is two times the value that the conventional spline was capable of. This means that with the present invention the output or load torque can be twice as much as that of the conventional gearing.

Figure 9:
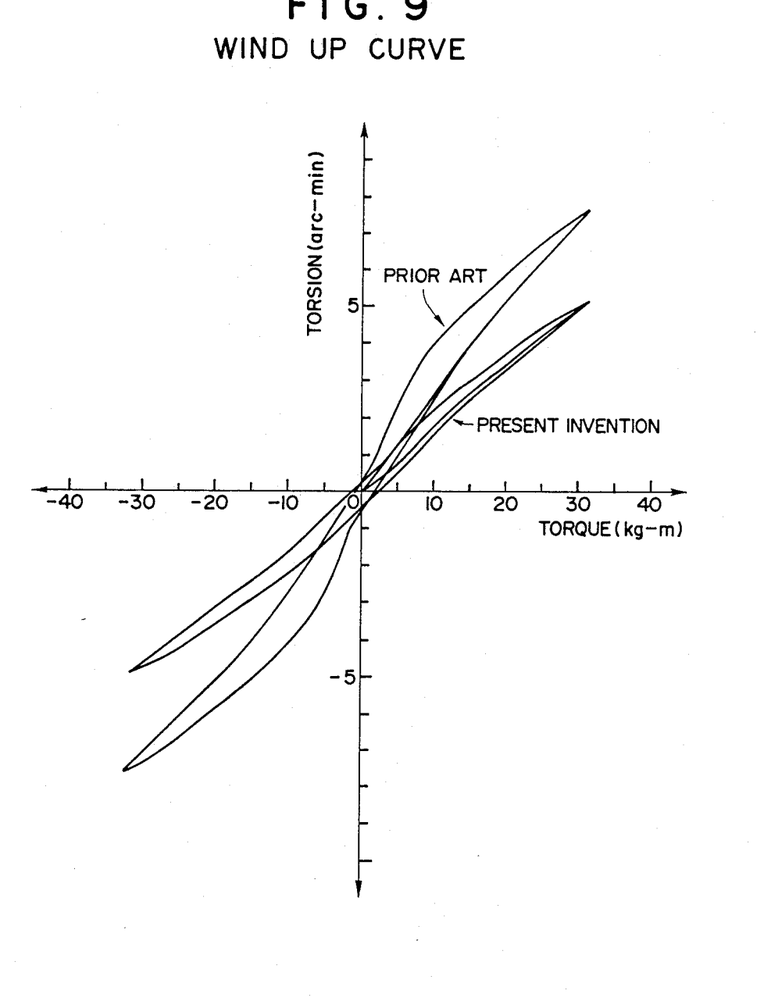
FIG. 9 is a graph showing a torsional stiffness of the strain wave gearing of the present invention in comparison with the conventional gearing.

FIG. 9 shows a graph of a wind up curve of the present invention and another wind up curve of the conventional gearing. The wind up curve teaches a tortional stiffness of the strain wave gearing. In order to obtain the wind up curve, the input shaft is stationarily fixed to prevent the shaft from rotating and then the load torque is applied to the output shaft from zero torque to a rated load torque and then gradually returned to zero torque. Under the conditions, the torsion amounts of the output shaft are plotted for each of different load torques. The measurement is also made with regard to the opposite rotation, thereby to obtain necessary wind up curves. In FIG. 9, the curve of the present invention has a gentle inclination in comparison with that of the conventional gearing curve. For example, the present invention has a torsion angle of 4.9 minutes for the load torque of 30 kg-m. The conventional strain wave gearing has a torsion angle of 7.5 minutes for the same torque (30 kg-m). Thus, the present invention improves the torsional stiffness so that the torsion amount decreases to 65 percents of the conventional gearing. Further, the present invention also improves the wind up curve, particularly, its hystresis characteristics. In fact, the hysteresis of the gearing of the present invention becomes smaller than that of the conventional gearing. Thus, the strain wave gearing of the present invention improves a positioning accuracy of the gearing.

Figure 10:
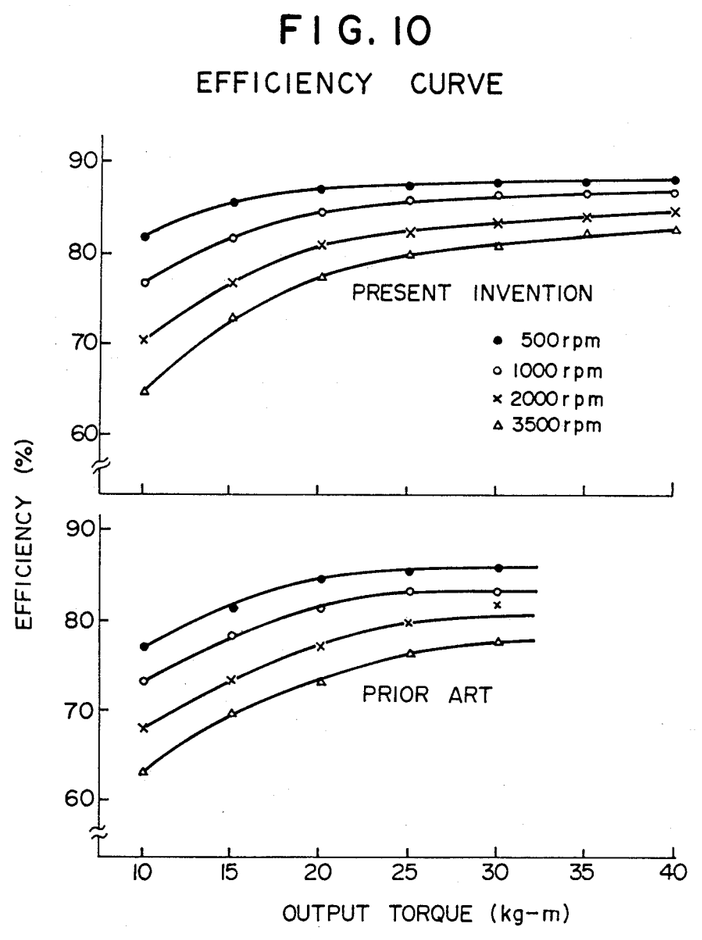
FIG. 10 is a graph showing the efficiency of the gearing of the present invention in comparison with the conventional gearing.

FIG. 10 shows a graph of efficiency curves of the strain wave gearing of the present invention and the conventional gearing. Even if the gearing of the present invention maintains the continuus contact between the flexspline and the circular spline in the engagement region, the efficiency of the present invention does not lower for all of the rotation speeds (500, 1000, 2000 and 3500 RPM).

The invention has thus been shown and described with reference to specific embodiments, however, it should be noted that the invention is not limited to the details of the illustrated structures but changes and modifications may be made without departing from the scope of the appended claims.

I claim:

1. A strain wave gearing comprising a rigid circular spline, a flexible flexspline disposed inside the circular spline, a wave generator means for, when rotated, deforming the flexspline and rotating the resulting shape of the thus deformed flexspline to produce a relative rotation between the flexspline and the circular spline, wherein the tooth face of each of the splines has a shape defined by a mapping curve which is a similarity transformation having a reduced scale of $\frac{1}{2}$ applied to a movement locus of the flexspline to the circular spline in accordance with the shape of the wave generator, said transformation being effected on a reference point where the splines are transferred from a condition of contact with each other to a condition of disengagement from each other.

2. The strain wave gearing of claim 1 wherein the flexspline is deformed into an elliptic configuration to bring the teeth of the flexspline into engagement with those of the circular spline at two points on the major axis of an ellipsoid.

3. The strain wave gearing of claim 1 wherein the flexspline is deformed to bring the flexspline into engagement with the circular spline at substantially equally spaced three points.

4. The strain wave gearing of claim 1 wherein the tooth faces of both of the flexspline and circular spline are formed into a specific convex profiles in accordance with the mapping curve obtained by the similarity transformation.

* * * * *